United States Patent
Fisher (10) Patent No.: US 9,528,309 B2
(45) Date of Patent: Dec. 27, 2016

(54) OUTDOOR POWER EQUIPMENT HOOD HINGE

(71) Applicant: Husqvarna AB, Huskvarna (SE)

(72) Inventor: Corey Fisher, Augusta, GA (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/435,550

(22) PCT Filed: Oct. 15, 2012

(86) PCT No.: PCT/US2012/060241
§ 371 (c)(1),
(2) Date: Apr. 14, 2015

(87) PCT Pub. No.: WO2014/062155
PCT Pub. Date: Apr. 24, 2014

(65) Prior Publication Data
US 2015/0292248 A1 Oct. 15, 2015

(51) Int. Cl.
*E05D 7/10* (2006.01)
*B62D 25/12* (2006.01)
(Continued)

(52) U.S. Cl.
CPC ............ *E05D 7/1044* (2013.01); *A01D 34/81* (2013.01); *B62D 25/12* (2013.01); *E05D 3/06* (2013.01);
(Continued)

(58) Field of Classification Search
CPC ........ E05D 7/1044; E05D 3/06; E05D 7/1083; E05D 7/10; E05D 7/12; E05D 7/18; E05D 5/10; E05D 2007/1088; B62D 25/10; B62D 25/12; E05Y 2900/536
(Continued)

(56) References Cited

U.S. PATENT DOCUMENTS 2,989,134 A * 6/1961 Kamlukin ............... A01D 34/43
180/292
3,059,271 A * 10/1962 Erickson ............... E05D 7/1044
16/261
(Continued)

FOREIGN PATENT DOCUMENTS

JP        2128967 A     5/1990

OTHER PUBLICATIONS

International Search Report and Written Opinion of PCT/US12/60241 mailed on Jan. 8, 2013, all enclosed pages cited.
(Continued)

*Primary Examiner* — Hau Phan
*Assistant Examiner* — Jacob Meyer
(74) *Attorney, Agent, or Firm* — Nelson Mullins Riley & Scarborough LLP (57) ABSTRACT

A hood hinge assembly for rotation of a hood of an outdoor power equipment device between an open position and a closed position may include a fixed bracket mounted directly or indirectly to a frame of the outdoor power equipment device, and a movable bracket mounted to the hood to enable the hood to be moved between the open position and the closed position via rotation of the movable bracket relative to the fixed bracket. The hood hinge assembly may define an axis of rotation for the hood via a first offset pin and a second offset pin that have respective distal ends oriented in the same direction for sequential engagement with respective ones of a first receiving hole and a second receiving hole that are spaced apart from each other by a distance greater than a distance between the respective distal ends of the first and second offset pins.

19 Claims, 10 Drawing Sheets (51) Int. Cl.
*A01D 34/81* (2006.01)
*E05D 3/06* (2006.01)

(52) U.S. Cl.
CPC ........ *E05D 7/1083* (2013.01); *E05Y 2900/536* (2013.01)

(58) Field of Classification Search
USPC ................. 180/69.2, 69.21, 69.22, 69.23
See application file for complete search history.

(56) References Cited

U.S. PATENT DOCUMENTS

| | | | | |
|---|---|---|---|---|
| 3,815,701 A * | 6/1974 | Mayhew | ................ | B62D 25/12 16/268 |
| 4,542,558 A * | 9/1985 | Brockhaus | .............. | E05D 5/128 16/263 |
| 5,048,154 A * | 9/1991 | Swartzendruber | .... | E05D 7/1066 16/260 |
| 5,195,215 A * | 3/1993 | Kiefer | .................... | E05D 5/062 16/223 |
| 5,645,133 A * | 7/1997 | Thompson | .............. | E05D 7/105 16/254 |
| 5,992,550 A * | 11/1999 | Gronlund | ................ | B62D 25/12 16/343 |
| 6,003,204 A * | 12/1999 | Roach | ................... | E05D 7/1072 16/266 |
| 6,039,388 A * | 3/2000 | Choi | ....................... | E05F 5/022 16/86 R |
| 7,195,307 B2 * | 3/2007 | Tucker | ................... | B62D 25/10 16/225 |
| 7,699,378 B2 * | 4/2010 | Smith | .................... | B62D 33/03 16/303 |
| 2006/0208528 A1* | 9/2006 | Tucker | ................... | B62D 25/10 296/146.11 |
| 2015/0337581 A1* | 11/2015 | Ikemoto | ................... | E05D 3/02 49/381 |

OTHER PUBLICATIONS

Chapter I of the International Preliminary Report on Patentability issued on Apr. 21, 2015, all enclosed pages cited.

* cited by examiner

OUTDOOR POWER EQUIPMENT HOOD HINGE

TECHNICAL FIELD

Example embodiments generally relate to outdoor power equipment and, more particularly, some embodiments relate to a hood hinge for outdoor power equipment such as, for example, lawn tractors.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Riding lawn mowers may sometimes take the form of lawn tractors that position an operator over a cutting deck and behind a steering assembly that is positioned between the engine of the lawn tractor and the seat that supports the operator. In such a form, the engine may be covered by a hood. The hood may function to protect the engine from the elements, but may also reduce the amount of noise that the operator hears and provide for an improved aesthetic appearance of the lawn tractor. In some cases, the hood may be mounted on a hinge assembly so that the operator can tilt the hood open for access to the engine. However, the employment of a hinge assembly could make it difficult or complicated to assemble the lawn tractor during the production process.

BRIEF SUMMARY OF SOME EXAMPLES

Some example embodiments may provide a hinge assembly that is relatively easy to utilize from an operator perspective, and relatively easy to assemble from a manufacturing perspective. Some embodiments may therefore provide a tractor hood hinge assembly that employs a fixed portion and a movable portion that allow the hood to be attached to the tractor by installing the movable portion onto the fixed portion during assembly. Moreover, according to some embodiments, the fixed portion may be provided to have offset pins oriented in the same direction. Provision of the offset pins may enable receiving holes that are disposed in the movable portion to be sequentially aligned and installed onto the pins so that relatively quick and easy installation of the hood may be achievable in an accurate and efficient manner. In this regard, for example, the hood may be slid into place on the offset pins without requiring tools for installing or tightening any pins or other components. Moreover, some embodiments may employ guiding surfaces on both the fixed portion and the movable portion in order to ensure that the installation is accomplished with proper alignment and that the movable portion is held in place after installation.

Some example embodiments may improve the speed and efficiency of production by enabling manufacturing personnel and/or machines to assembly lawn tractors more quickly and easily. Example embodiments may also make is easier for owners and/or operators to remove and reassemble the hood, if desired.

In an example embodiment, an outdoor power equipment device is provided. The outdoor power equipment device includes a cutting deck mounted to a frame and housing at least one blade, an engine and a hood hinge assembly. The engine may be supported by the frame and configured to selectively provide for rotation of the at least one blade responsive to coupling of rotary power of the engine to the at least one blade. The engine may be disposed in an engine compartment covered by a hood. The hood hinge assembly includes a fixed bracket mounted directly or indirectly to the frame and a movable bracket mounted to the hood to enable the hood to be moved between an open position and a closed position via rotation of the movable bracket relative to the fixed bracket. The hood hinge assembly defines an axis of rotation for the hood via a first offset pin and a second offset pin that have respective distal ends oriented in the same direction for sequential engagement with respective ones of a first receiving hole and a second receiving hole that are spaced apart from each other by a distance greater than a distance between the respective distal ends of the first and second offset pins.

In another example embodiment, a hood hinge assembly may be provided. The hood hinge assembly may provide for rotation of a hood of an outdoor power equipment device between an open position and a closed position and may include a fixed bracket mounted directly or indirectly to a frame of the outdoor power equipment device, and a movable bracket mounted to the hood to enable the hood to be moved between the open position and the closed position via rotation of the movable bracket relative to the fixed bracket. The hood hinge assembly may define an axis of rotation for the hood via a first offset pin and a second offset pin that have respective distal ends oriented in the same direction for sequential engagement with respective ones of a first receiving hole and a second receiving hole that are spaced apart from each other by a distance greater than a distance between the respective distal ends of the first and second offset pins.

In another example embodiment, a method of installing a hood of an outdoor power equipment device is provided. The method may include providing assembly of a hood hinge assembly for rotation of the hood of an outdoor power equipment device between an open position and a closed position. The hood hinge assembly may include a fixed bracket mounted directly or indirectly to a frame of the outdoor power equipment device, and a movable bracket mounted to the hood to enable the hood to be moved between the open position and the closed position via rotation of the movable bracket relative to the fixed bracket. The hood hinge assembly may define an axis of rotation for the hood via a first offset pin and a second offset pin that have respective distal ends oriented in the same direction for sequential engagement with respective ones of a first receiving hole and a second receiving hole that are spaced apart from each other by a distance greater than a distance between the respective distal ends of the first and second offset pins. In the context of this method, providing assembly may include aligning the first receiving hole with the first offset pin while the second receiving hole is spaced farther apart from the second offset pin than a distance between the first offset pin and the first receiving hole, seating the first receiving hole onto the first offset pin while aligning the second receiving hole with the second offset pin, and seating the second receiving hole onto the second offset pin.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2, which includes

FIG. 3, which includes

FIG. 4, which includes

FIG. 6, which includes

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

For a typical tractor hood, it has been common to enable the tractor hood to be rotated from an operational position (where the hood is down) to a non-operational position (where the hood is tilted upward). To facilitate this rotation between positions, some form of hinge assembly is commonly used. Though often provided at the front of the tractor, the hinge assembly could also be in the back of the engine compartment in some cases. However, regardless of the location of the hinge assembly, it has typically been embodied in one of a relatively few simple constructions, some of which have minor variations. For example, one common construction has involved the use of a movable bracket that is mounted to the hood in a fixed manner and then rotatably coupled to a fixed bracket that is mounted to the frame, chassis or portion of the engine complex. In some cases, the movable bracket may be rotatably coupled to the fixed bracket via pins, or screws that are inwardly oriented and disposed to face opposite directions. To complete this construction, a pin or screw may be passed from the outside of each opposing side of the movable brackets through holes in the fixed and movable brackets. The movable bracket may therefore rotate about the pin or screw. In some cases, a nut or cotter pin may be provided on the inner side of the pin or screw to prevent the movable bracket from being disengaged from the pin or screw to allow the movable bracket to be removed from rotatable coupling with the fixed bracket.

Employment of this construction may require the holes in the movable bracket to be aligned with corresponding holes in the fixed bracket before the passing the pin or screw through the holes on each side. As a variation, one pin may be pre-installed and the hole on the corresponding side of the movable bracket may be installed onto the pre-installed pin. Then the holes on the movable and fixed brackets on the opposing side may be aligned so that the other pin can be passed therethrough to complete the installation.

In some alternative constructions, the fixed bracket may include a hook or cradle assembly disposed proximate to opposite sides of the hood to enable a rod or some other component of the movable bracket to rotatably engage or rest in the hook or cradle. In this alternative construction as well, some form of nut or other fastener may be used to prevent disengagement of the movable and fixed brackets.

The use of nuts, cotter pins or other similarly functioning components may complicate construction of the tractor relative to placement of the hood during manufacturing. Moreover, these components may also be more difficult for operators to manipulate later on in case maintenance, inspection or other situations arise that would cause the operator to want to lift or remove the hood. Accordingly, some embodiments may provide a hinge assembly that is relatively easy to install and disassemble. Some embodiments may therefore provide a tractor hood hinge assembly that employs a fixed bracket and a movable bracket that are constructed so that a pair of offset pins oriented in the same direction are provided in the fixed bracket to receive the movable bracket while allowing relatively easy alignment (sequentially and independently of each other) of the holes in the movable bracket. By providing the offset pins to be oriented in the same direction, the movable bracket may be slid onto pre-installed pins in one directional motion. Moreover, by providing the offset pins such that they are offset (e.g., spaced slightly closer together than the corresponding distance between receiving holes on the movable bracket), each receiving hole can be sequentially aligned to further facilitate relatively easy installation.

Figure 1:
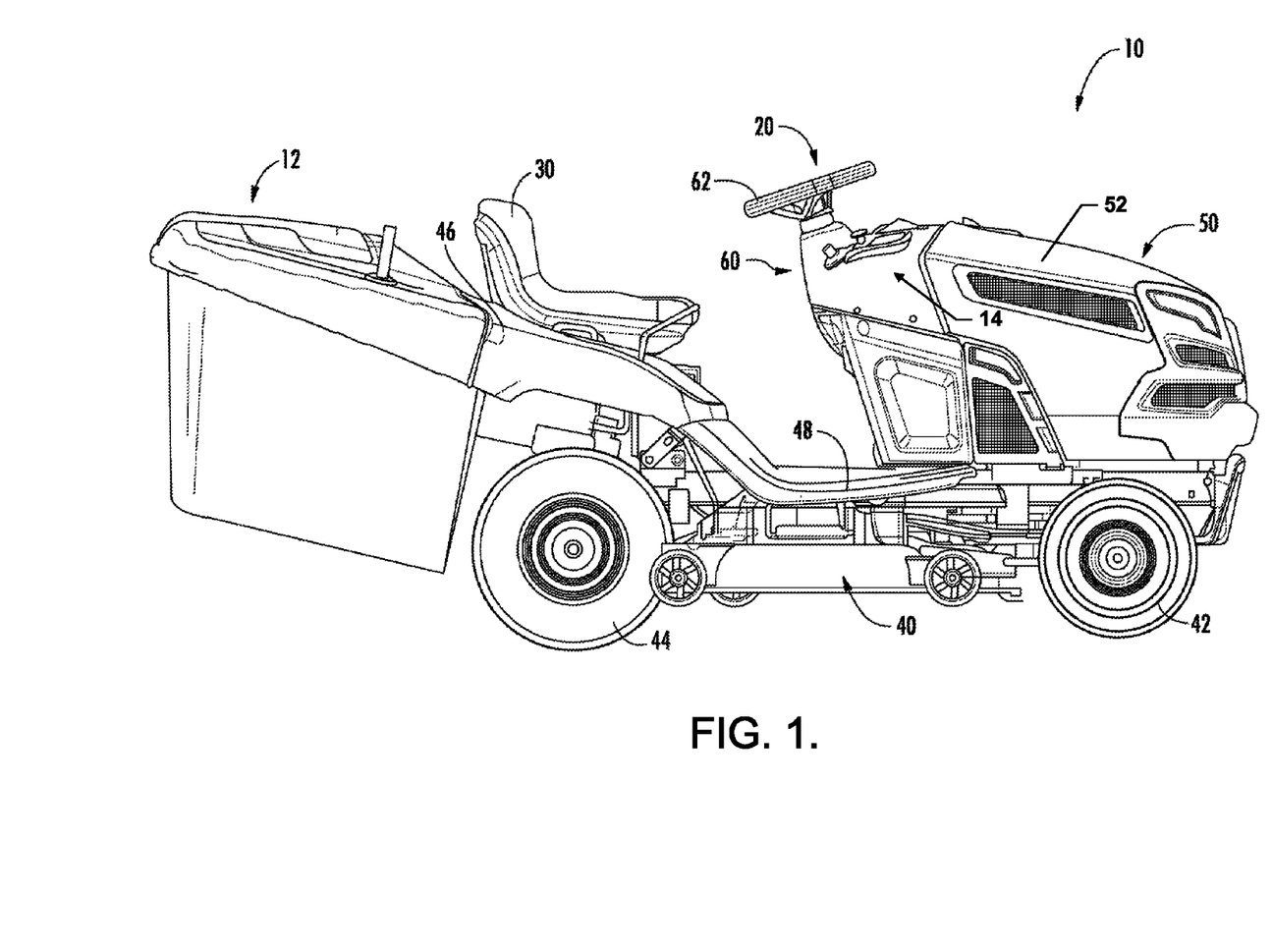
FIG. 1 illustrates a perspective view of the riding lawn care vehicle according to an example embodiment.

FIG. 1 illustrates an example lawn care device in the form of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an operations panel 14 that may display operational information regarding the riding lawn care vehicle 10 and host various controls, gauges, switches, displays and/or the like. As shown and described herein, the riding lawn care vehicle 10 may be a riding lawn mower (e.g., a lawn tractor, front-mount riding lawn mower, zero-turn riding lawn mower, cross mower, stand-on riding lawn mower, and/or the like). However, other example embodiments may be employed on other outdoor power equipment devices, such as walk behind lawn mowers, tillers, snow throwers, and/or the like where a hood is hingedly attached to cover one or more components of the corresponding device.

The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments the shafts are coupled to a motor via a system of belts and pulleys. In other embodiments the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, cutting height adjusters and/or the like. Some of the controllers, such as the speed controllers, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine compartment 50 of the riding lawn care vehicle 10 is disposed substantially forward of a seated operator and may house the engine of the riding lawn care vehicle 10. However, in other example embodiments, the engine compartment 50 could be in different positions such as below or behind the operator. In some embodiments, the engine may be operably coupled to one or more of the wheels of the riding lawn care vehicle 10 in order to provide drive power for the riding lawn care vehicle 10. In some embodiments, the engine may be capable of powering two wheels, while in others, the engine may power all four wheels of the riding lawn care vehicle 10. Moreover, in some cases, the engine may manually or automatically shift between powering either two wheels or all four wheels of the riding lawn care vehicle 10. The engine may be housed within a cover or hood 52 to at least partially form the engine compartment 50 to protect engine components and improve the aesthetic appeal of the riding lawn care vehicle 10.

In an example embodiment, the engine compartment 50 may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine may also provide power to turn the cutting blade or blades disposed within the cutting deck 40. In this regard, for example, the engine may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

In an example embodiment, the engine compartment 50 may be accessed by opening the hood 52 to expose the engine. Opening the hood 52 may include tilting the hood from an operational or closed position (shown in FIG. 1) to an open or generally non-operational position (shown in FIG. 2). The top portion of the hood 52 may be held angled relative to the surface on which the riding lawn care vehicle 10 is supported when the hood 52 is held in the open position. In some embodiments, transitioning from the closed position to the open position may be accomplished by rotating the hood 52 between positions using a hinge assembly 100.

Figure 2A:
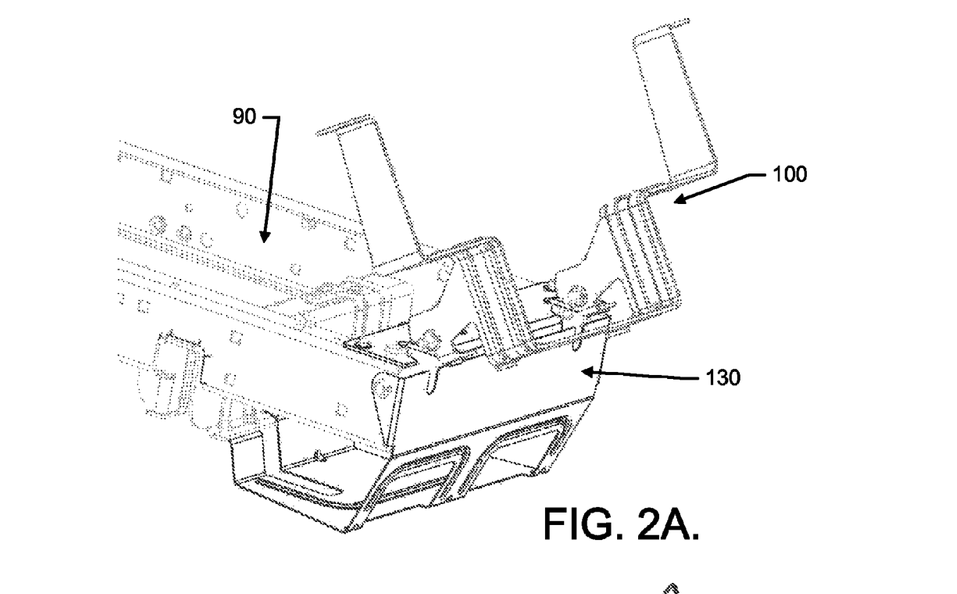
FIGS. 2A, 2B and 2C, illustrates a hood of the riding lawn care vehicle rotated to an open position via a hinge assembly of an example embodiment.
Figure 2B:
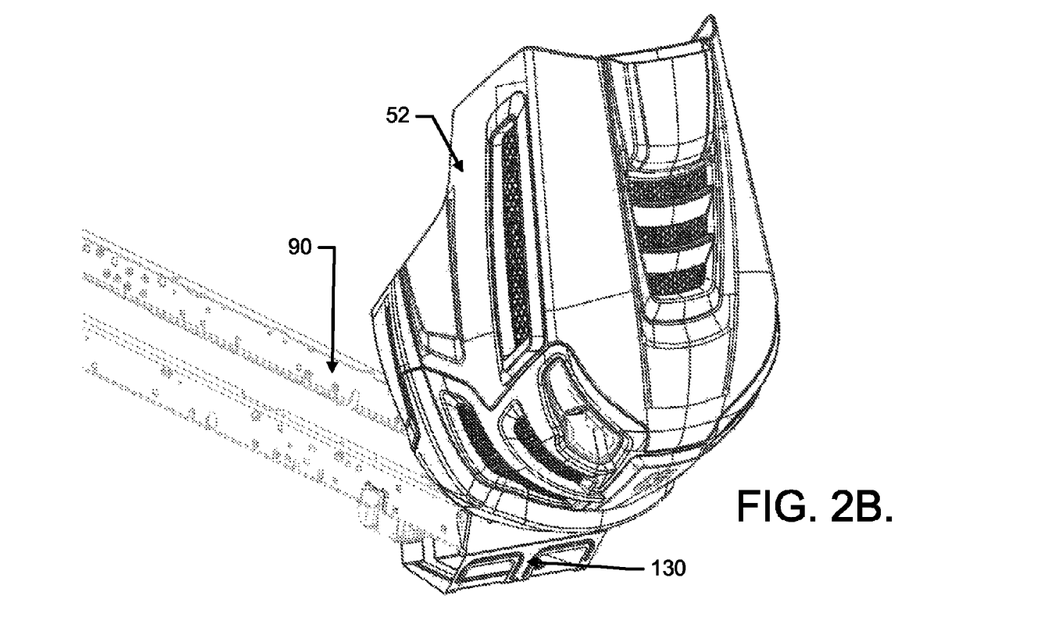
Figure 2C:
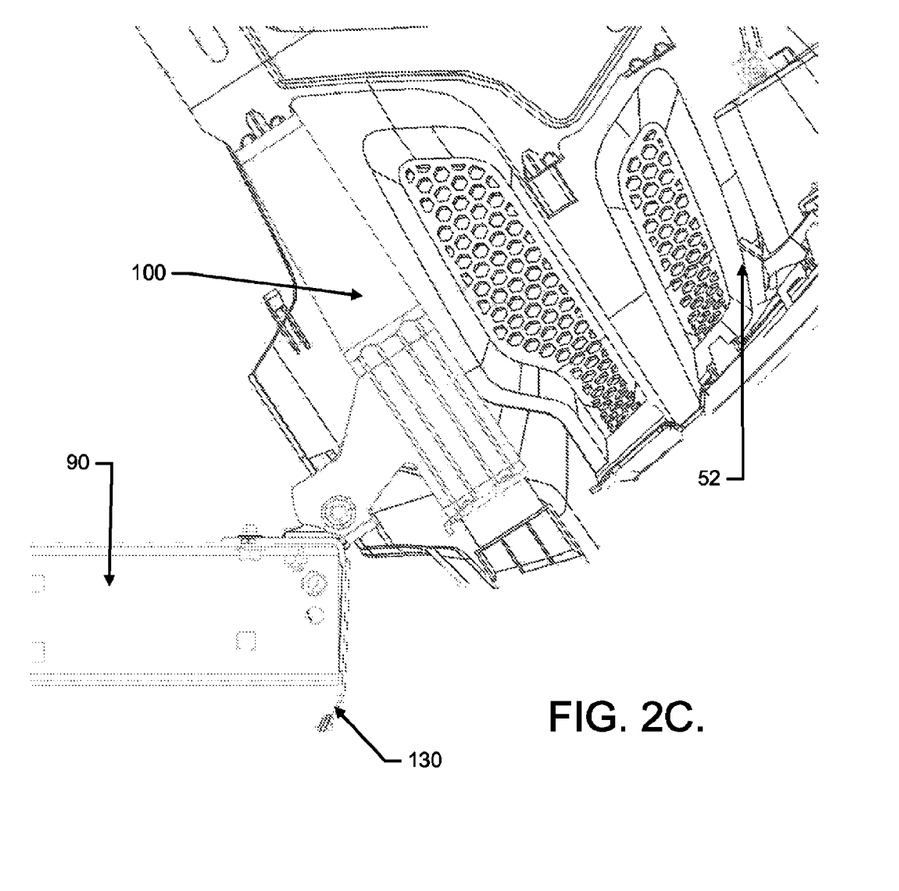

FIG. 2, which includes FIGS. 2A, 2B and 2C, illustrates how the hood hinge assembly 100 connects to a frame 90 of the riding lawn care vehicle 10. In this regard, FIG. 2A illustrates a perspective view of the hood hinge assembly 100 attached to a front plate 130 that may be attached to a front portion of the frame 90. In FIG. 2A, the hood 52 is removed to expose the hood hinge assembly 100. However, in FIG. 2B the hood hinge assembly 100 is in the same open position that is shown in FIG. 2A, except that the hood 52 is now shown assembled onto the hood hinge assembly 100. FIG. 2C illustrates a cross sectional view of the hood hinge assembly 100 is in the same open position that is shown in FIGS. 2A and 2B. The view shown in FIG. 2C is of the left half of the hood 52 and the hood hinge assembly 100 since the cross section is cut down the longitudinal centerline of the hood 52.

Figure 3A:
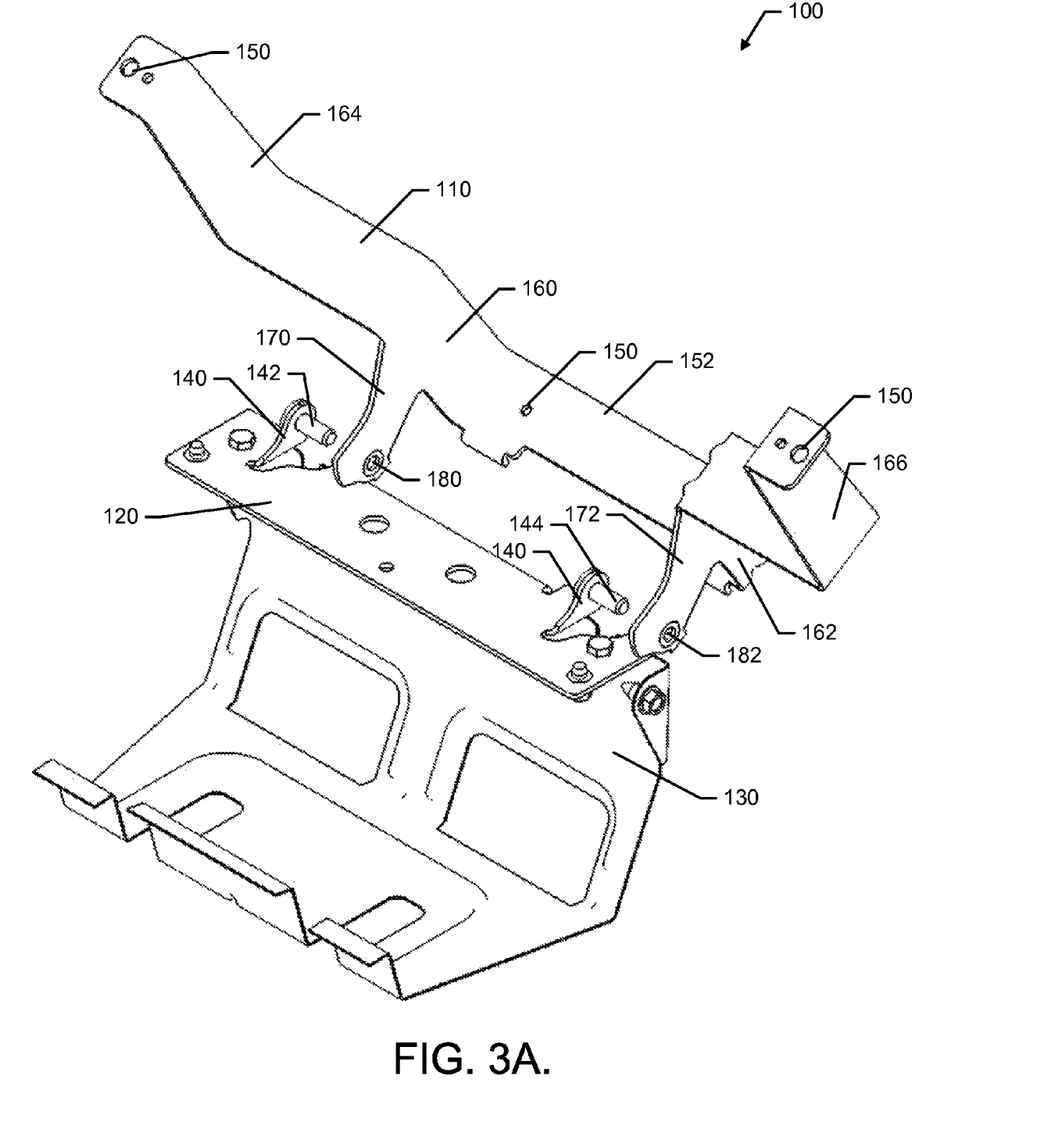
FIGS. 3A, 3B and 3C, illustrates a perspective view of the hinge assembly in various respective states to illustrate a sequence of installation and operation thereof according to an example embodiment.
Figure 3B:
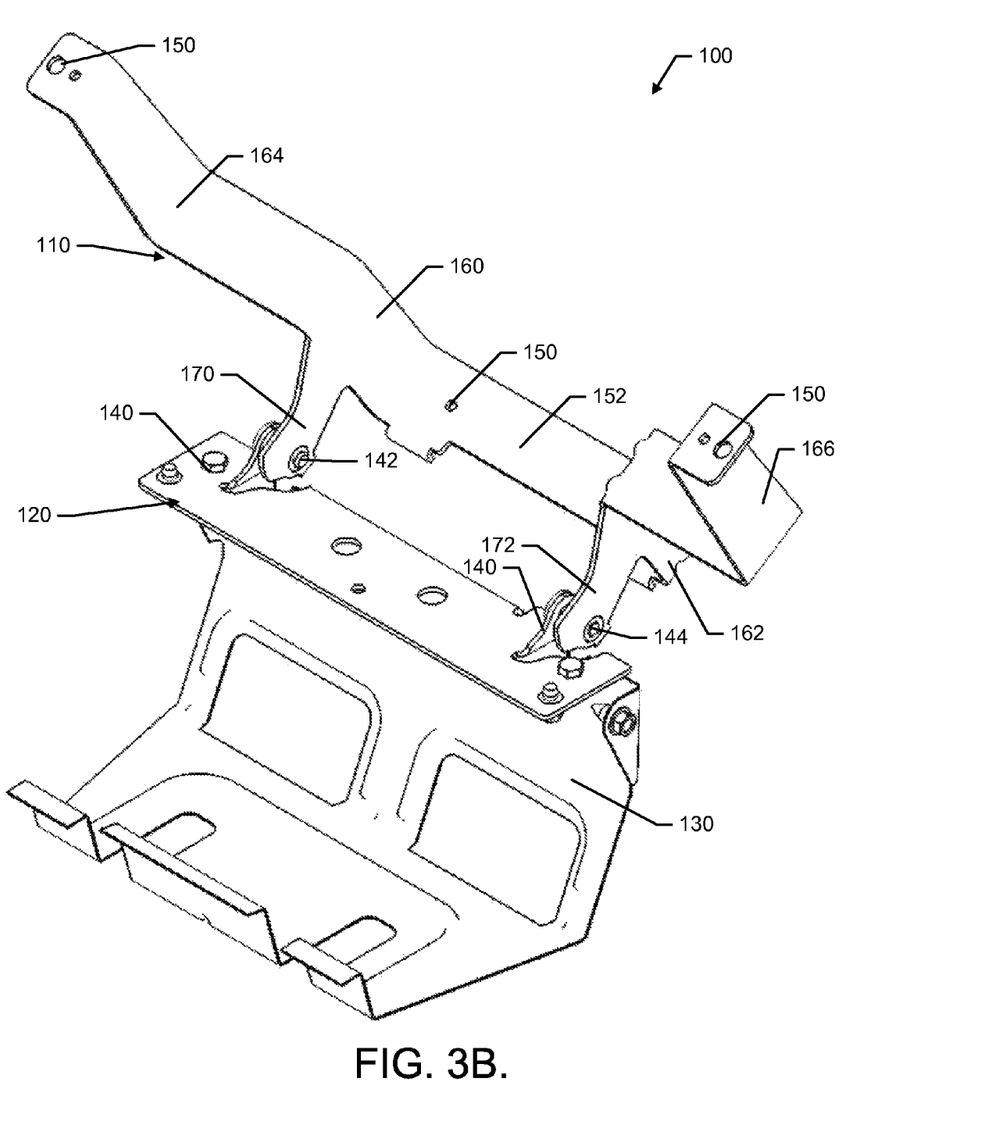
Figure 3C:
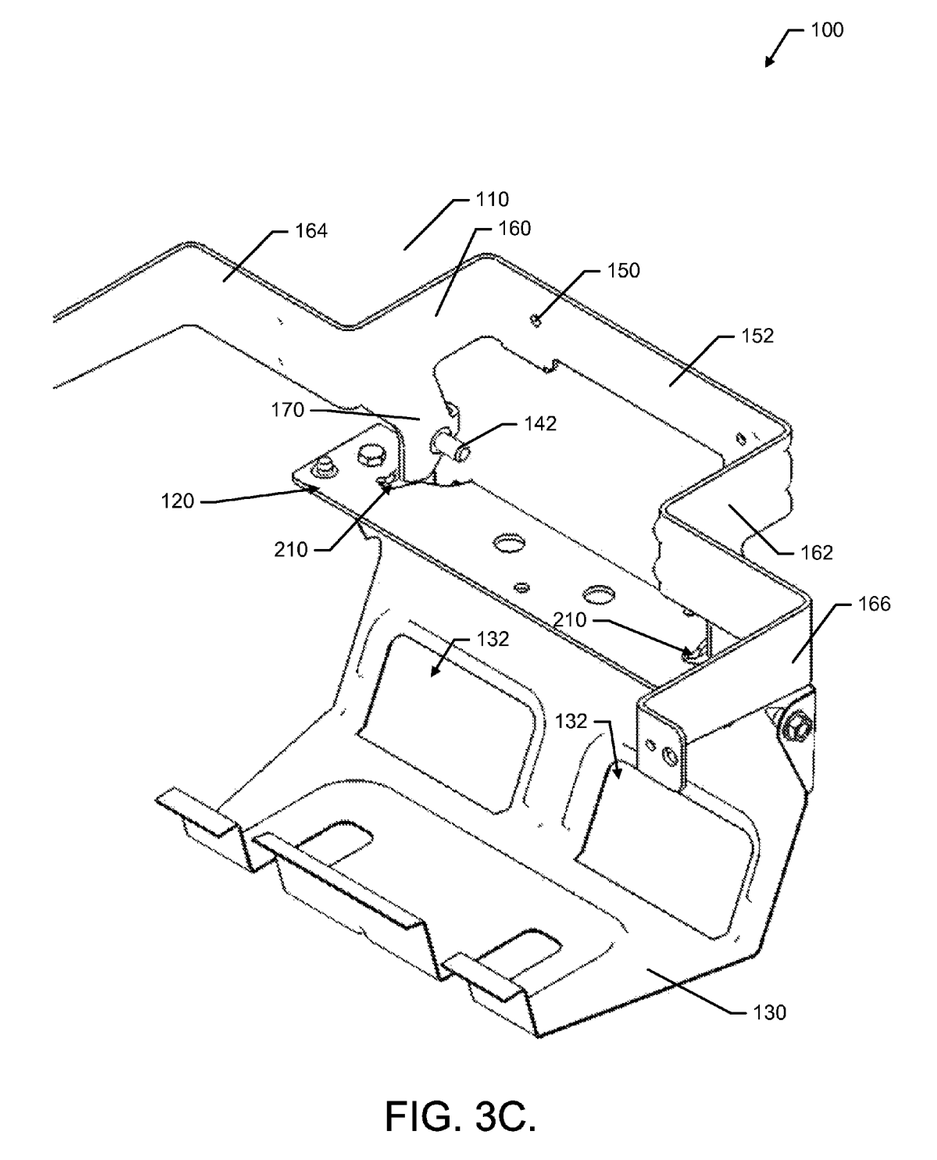
Figure 4A:
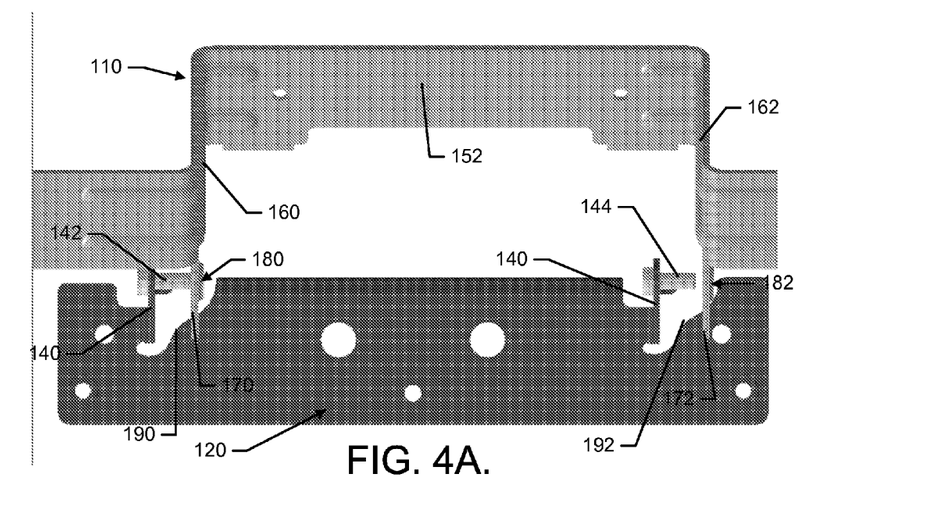
FIGS. 4A and 4B, illustrates a top view of the hinge assembly to illustrate the installation sequence according to an example embodiment.
Figure 4B:
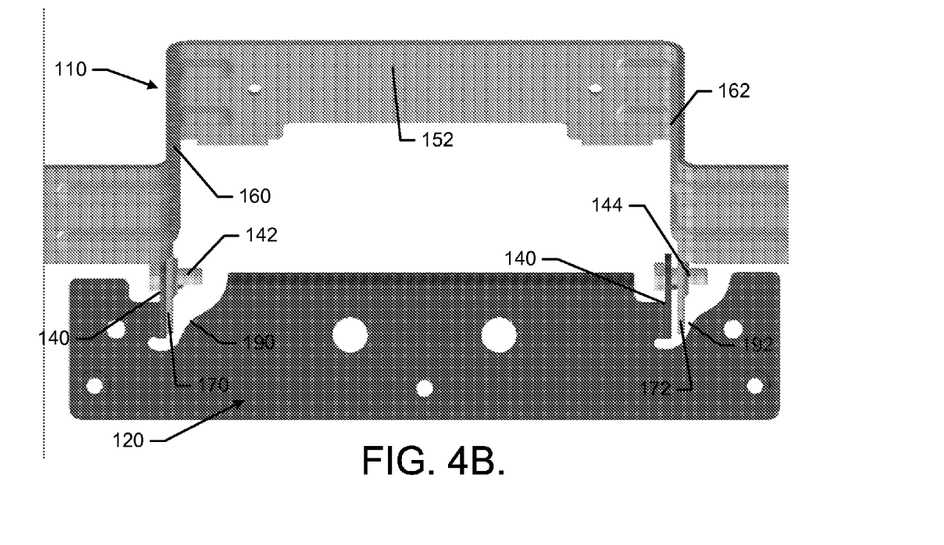

FIG. 3, which includes FIGS. 3A, 3B and 3C, illustrates a perspective view of the hinge assembly 100 in various respective states to illustrate a sequence of installation and operation thereof according to an example embodiment. In this regard, FIG. 3A shows the hinge assembly 100 prior to installation of a movable bracket 110 onto a fixed bracket 120. FIG. 3B shows the movable bracket 110 installed onto a fixed bracket 120 with the movable bracket 110 being in the open or non-operational position. FIG. 3C shows the movable bracket 110 installed onto a fixed bracket 120 with the movable bracket 110 being in the closed or operational position. FIG. 4, which includes FIGS. 4A and 4B, illustrates a top view of the hinge assembly 100 to illustrate the installation sequence according to an example embodiment. In this regard, FIG. 4A illustrates alignment of the movable bracket 110 with the fixed bracket 120 according to an example embodiment, while FIG. 4B illustrates the fixed bracket 120 and movable bracket 110 mated with one another after installation according to an example embodiment.

Referring now primarily to FIGS. 3 and 4, it should be appreciated that the fixed bracket 120 may be affixed to the frame or chassis of the riding lawn care vehicle 10, either directly or indirectly. Moreover, in some cases, the fixed bracket 120 could be integrally part of the frame or chassis of the riding lawn care vehicle 10. However, in the present example, the fixed bracket 120 will be shown as a separate component that is attached (e.g., via bolts) to a front plate 130 of the riding lawn care vehicle 10. The front plate 130 may be directly mounted to the frame or chassis and may form a forward boundary of the engine compartment 50. The front plate 130 may therefore combine with the hood 52 to bound the engine compartment 50. The front plate 130 may include other features in some embodiments, such as brand markings, design features, vent holes and/or the like.

In an example embodiment, the fixed bracket 120 may have a main body portion that is substantially flat and plate shaped. The fixed bracket 120 may be mounted to lie substantially in a plane that is parallel to a plane of the ground or other surface on which the riding lawn care vehicle 10 operates. However, it should be appreciated that the fixed bracket 120 could be oriented to lie substantially perpendicular to the surface or at some other angle relative to the surface in other embodiments. Regardless of the orientation of the fixed bracket 120, the fixed bracket 120 may include pin-holding wings 140 that are oriented to extend away from the main body of the fixed bracket 120. The pin-holding wings 140 may be in planes that are substantially parallel to each other, and substantially perpendicular to the main body of the fixed bracket 120 and/or the surface over which the riding lawn care vehicle 10 operates.

The pin-holding wings 140 may each include receiving holes through which offset pins are passed. The offset pins may include a first offset pin 142 and a second offset pin 144. The first and second offset pins 142 and 144 may be affixed to the pin-holding wings 140 by any suitable means, or may be integrally formed as part of the fixed bracket 120. As shown in FIGS. 3 and 4, the first and second offset pins 142 and 144 may be oriented in the same direction. Moreover, in some cases, a single line may pass through the axis of both the first and second offset pins 142 and 144 so that when the movable bracket 110 is installed onto the fixed bracket 110, the first and second offset pins 142 and 144 form the axis of rotation about which the movable bracket 110 is enabled to move.

The movable bracket 110 may provide a frame upon which the hood 52 may be mounted. Thus, for example, the movable bracket 110 may include hood mounting holes 150 through which bolts, screws, rivets or other fixing mechanisms may be provided to hold the hood 52 to the movable bracket 110. Accordingly, when the movable bracket 110 is moved or rotated between the operational (closed) position and the non-operational (open) position, the hood 52 will correspondingly be lowered and lifted, respectively. Although the movable bracket 110 may take any suitable shape, the movable bracket 110 of this example embodiment includes a front member 152 into which some of the mounting holes 150 are provided. The mounting holes 150 on the front member 152 may be used to support fixing members that pass therethrough to engage a front portion of the hood 52.

Extending substantially perpendicularly rearward from opposite ends of the front member 152, the movable bracket 110 may further include a first bracket arm 160 and a second bracket arm 162. The first and second bracket arms 160 and 162 may each further support corresponding first and second L-brackets 164 and 166 that extend therefrom such that the front member 152, the first and second bracket arms 160 and 162 and the first and second L-brackets 164 and 166 form a continuous series of structures that all extend within a common plane. Distal ends of the first and second L-brackets 164 and 166 may include mounting holes 150 to form additional places at which the movable bracket 110 may engage the hood 52.

In an example embodiment, the first bracket arm 160 may include a first pivot arm 170 and the second bracket arm 162 may include a second pivot arm 172. The first and second pivot arms 170 and 172 may extend out of the plane in which the front member 152, the first and second bracket arms 160 and 162 and the first and second L-brackets 164 and 166 lie in the same direction and substantially parallel to each other. The first and second pivot arms 170 and 172 may also lie substantially parallel to the pin-holding wings 140.

In an example embodiment, the first pivot arm 170 may include a first receiving hole 180 disposed proximate to a distal end thereof. Meanwhile, the second pivot arm 172 may include a second receiving hole 182 disposed proximate to a distal end thereof. The first and second pivot arms 170 and 172 and the first and second receiving holes 180 and 182 may substantially mirror each other with respect to the front member 152. The first and second receiving holes 180 and 182 may be shaped to receive the first and second offset pins 142 and 144 when the movable bracket 110 is installed onto the fixed bracket 120. However, the first and second offset pins 142 and 144 may be provided in such a manner as to enable the first and second receiving holes 180 and 182 to be sequentially aligned and installed instead of being simultaneously aligned and installed. Accordingly, the alignment and installation of the movable bracket 110 onto the fixed bracket 120 (and therefore the installation of the hood 52 onto the riding lawn care vehicle 10) may be more easily accomplished.

The offsetting of the first and second offset pins 142 and 144 may be provided to allow sequential alignment thereof. Offsetting may refer to the fact that the distance d between a distal end of the first offset pin 142 and a distal end of the second offset pin 144 is less than the distance D between faces of the first and second pivot arms 170 and 172 that are proximate to the pin-holding wings 140. The offsetting may be accomplished in a number of different ways. As shown in FIG. 4, one way to enable sequential alignment of the first and second receiving holes 180 and 182 with the first and second offset pins 142 and 144 may be to provide the distance d' between the pin-holding wings 140 to be less than the distance D between faces of the first and second pivot arms 170 and 172. In this example d may be equal to d'. However, another way to provide the offsetting may be to make the distance between pin-holding wings 140 the same as the distance D between faces of the first and second pivot arms 170 and 172, while providing the first offset pin 142 to have a different length than the second offset pin 144. For example, the second offset pin 144 may be shorter than the first offset pin 142 in order to make the distance between distal ends of the first and second offset pins d less than the distance D.

By making the distance between distal ends of the first and second offset pins d less than the distance D, the first receiving hole 180 may be aligned with the first offset pin 142 without any need to simultaneously align the second receiving hole 182 with the second offset pin 144 as shown in FIG. 4A. Thereafter, the second receiving hole 182 may be independently and more easily aligned with the second offset pin 144 to complete the installation as shown in FIG. 4B. As can be appreciated from the image of FIG. 4B, in some embodiments, when the movable bracket 110 is installed onto the fixed bracket 120, the first pivot arm 170 may lie immediately adjacent to the corresponding pin-holding wing 140 of the first offset pin 142. However, the second pivot arm 172 may be spaced apart from the corresponding pin-holding wing 140 of the second offset pin 144. The amount of the spacing provided between the second pivot arm 172 of the pin-holding wing 140 of the second offset pin 144 may be substantially equal to the difference between distance D and distance d.

In some embodiments, the movable bracket 110 may be made such that the first and second receiving holes 180 and 182 are extruded rather than being punched holes. By employing extruded holes, a greater surface area for contact with the first and second offset pins 142 and 144 may be provided than that which would otherwise be provided by a punched hole. The use of an extruded hole may also enable the opening to be radiused in a manner that allows for easier alignment of the receiving holes and the offset pins during installation.

After installation, the movable bracket 110 may be moved between the closed position (shown in FIG. 3C) and the open position (shown in FIG. 3B) by rotating the movable bracket 110 about the first and second offset pins 142 and 144. Although a nut or cotter pin could be used on the distal ends of the first and second offset pins 142 and 144 to prevent the first and second receiving openings 180 and 182 from unseating themselves from the first and second offset pins 142 and 144, respectively, some embodiments may not require any such fixing elements on the distal ends of the first and second offset pins 142 and 144. Instead, some embodiments may employ locking cams on the fixed bracket 120 to guide the first and second pivot arms 170 and 172 into position when the movable bracket 110 is installed onto the fixed bracket 120. In this regard, as shown in FIG. 4, a first locking cam 190 may be provided proximate to the pin-holding wing 140 of the first offset pin 142 and a second locking cam 192 may be provided proximate to the corresponding pin-holding wing 140 of the second offset pin 144. The first and second locking cams 190 and 192 may be cam surfaces that face the respective first and second offset pins 142 and 144 and are formed by cutting out a portion of the main body of the fixed bracket 120.

Meanwhile, the first and second pivot arms 170 and 172 may include respective first and second cam edges 200 and 202 disposed proximate to respective ones of the first and second receiving holes 180 and 182. In some embodiments, the first and second cam edges 200 and 202 may be rearward and below the respective ones of the first and second receiving holes 180 and 182 when the movable bracket 110 is in the closed position (as shown in FIG. 3C). The first and second cam edges 200 and 202 may be configured to ride along the first and second locking cams 190 and 192, respectively, to provide the first and second cam edges 200 and 202 into a hinge slot 210 that is slightly wider than a width of respective ones of the first and second pivot arms 170 and 172. The hinge slot 210 may sit immediately adjacent to the respective pin-holding wings 140 and the movable bracket 110 may be enabled to move between open and closed positions freely while the first and second pivot arms 170 and 172 are within the hinge slot 210. However, although the first and second cam edges 200 and 202 may clear the first and second locking cams 190 and 192 when the movable bracket 110 is in the open position, as the movable bracket 110 rotates to the closed position, the first and second cam edges 200 and 202 may engage the first and second locking cams 190 and 192 to be guided into the hinge slot 210 of each respective side so that proper alignment is provided as the hood 52 is closed. Moreover, as shown in FIGS. 3 and 4, when the first and second pivot arms 170 and 172 are fully seated onto the first and second offset pins 142 and 144, respectively, the distal ends of the first and second pivot arms 170 and 172 will ride within their respective hinge slots 210 to keep the hood retained in the side-to-side direction.

It should be appreciated that although the example described above provides the first and second receiving holes 180 and 182 on the movable bracket 110 and the first and second offset pins 142 and 144 on the fixed bracket 120, this arrangement could easily be reversed in some alternative embodiments. Thus, for example, the pin-holding wings 140 could instead be converted to include receiving holes and the pivot arms of the movable bracket 110 could instead be converted to include offset pins having distal ends oriented in the same direction, while having those distal ends spaced apart by a distance that is less than the distance between the receiving holes.

Figure 5:
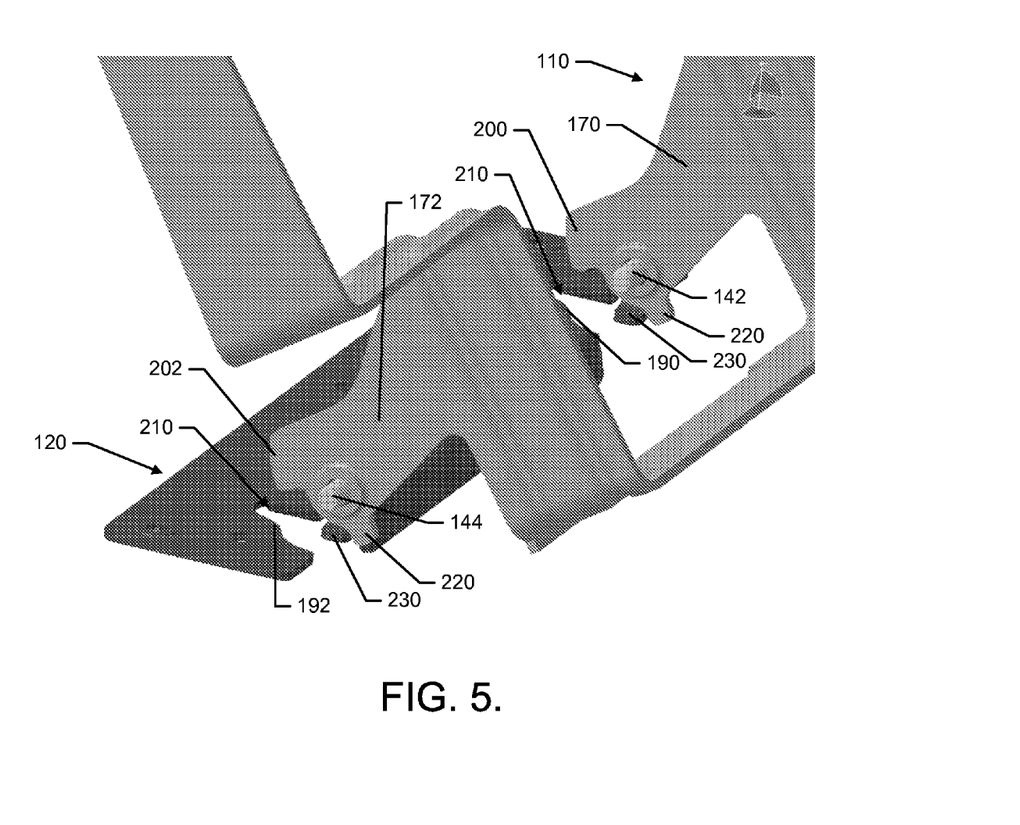
FIG. 5 shows a variation on the examples of FIGS. 2 to 4 in which a rotational stop is provided at a portion of the first and second pivot arms according to an example embodiment.

FIG. 5 shows a variation on the examples described above in which a rotational stop is provided at a portion of the first and second pivot arms 170 and 172. As shown in FIG. 5, a detent or rotational stop 220 may be provided on each of the forward portions of the first and second pivot arms 170 and 172. Meanwhile, a corresponding rotation limiter 230 may be provided to extend from the main body of the fixed bracket 120. The rotation limiter 230 may be configured to ride along a portion of the first and second pivot arms 170 and 172 that is proximate to the first and second receiving holes 180 and 182, respectively. As such, the area between the first and second cam edges 200 and 202 and the rotational stop 220 on each respective one of the first and second pivot arms 170 and 172 may define the limits for rotation of the movable bracket 110. In this regard, when opened fully, the rotational stop 220 may engage the rotation limiter 230 and when fully closed, the first and second cam edges 200 and 202 may limit movement by encountering the rotation limiter 230. Meanwhile, over the entire range of motion of the hinge, the rotation limiter 230 may be proximate to or even contact the portion of the corresponding pivot arm that is between the respective cam edge and the rotational stop 220 so that there is no slop or play in the operation of the hinge. Instead, a relatively consistent rotation of the hinge is achievable about a single axis.

Figure 6A:
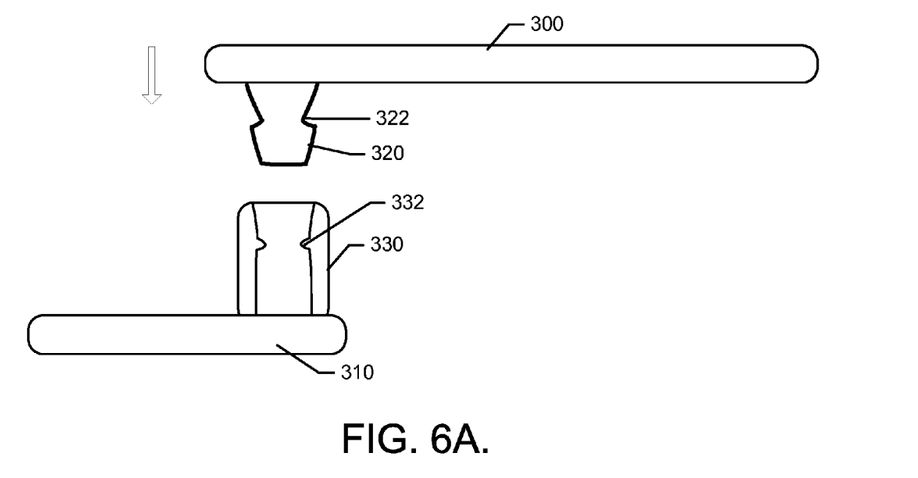
FIGS. 6A and 6B, shows a hood retention feature including corresponding male and female parts according to an example embodiment.
Figure 6B:
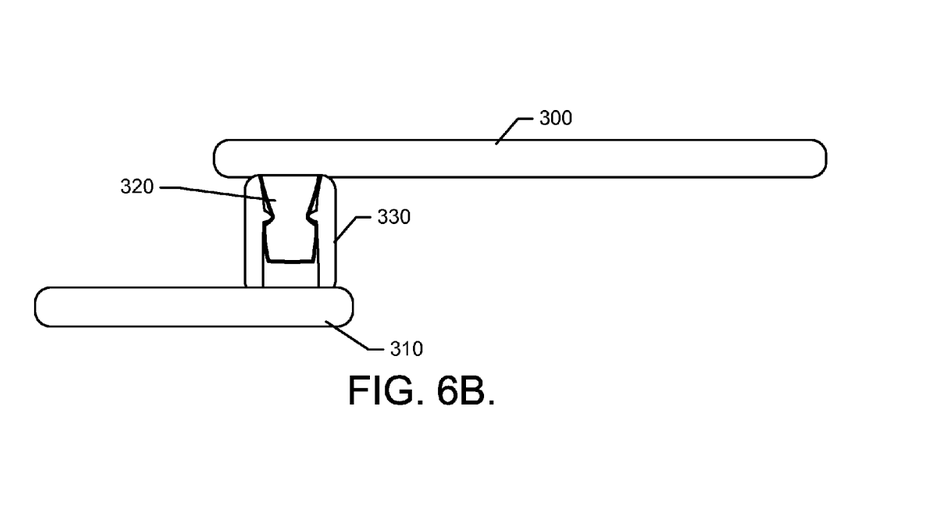

In some embodiments, it may be desirable to provide a hood retention feature to prevent excessive bouncing of the hood 52 during operation (especially over rough terrain. Accordingly, some embodiments may employ one or more male and female retention features disposed at the free end of the hood 52 (which in this case is the end of the hood 52 that is closest to the operations panel 14, or the rear portion of the hood 52). As an example, a male part may be provided on the hood 52 and a female part may be provided on a forward portion of the operations panel 14 that may be slightly overlapped by the hood 52 when the hood is closed. FIG. 6, which includes FIGS. 6A and 6B, shows a cross section view of a rear portion 300 of the hood closing toward a forward lip 310 of the operations panel or dash where these two components are held together by a hood retention feature including corresponding male and female parts as described below. A male part 320 is provided on the rear portion 300 and a female part 330 is provided on the forward lip 310. However, it should be appreciated that the positions of the male part 320 and the female part 330 may be reversed. The male part 320 and female part 330 may be aligned so that as the hood is closed, the male part 320 is received into the female part 330. FIG. 6A shows the substantial alignment of the male part 320 with the female part 330 prior to hood closure, and FIG. 6B shows the insertion of the male part 320 into the female part 330 responsive to hood closure.

In an example embodiment, the male part 320 may be a plastic, metal or other rigid component and the female part 330 may be made of rubber or another relatively flexible and elastic material. The male part 320 may have one or more ridges 322 and the female part 330 may have one or more corresponding catch portions 332 to engage the ridges 322. The female part 330 may provide some shock absorption function, but may also grasp the male part 320 to provide at least some holding force to prevent bouncing of the hood.

The alignment function provided by the hood retention feature may help ensure proper closure of the hood. The hood and dash may also be held or locked together by the hood retention feature to increase the quality of fit and finish and improve the overall perception of value of the riding lawn care vehicle 10. Bouncing of the hood may also be reduced in order to reduce the ability for the hood to twist and also decrease noise.

Thus, example embodiments provide a hood hinge that can be used on a lawn tractor, or any of various other types of outdoor power equipment that employ a hood. The hood hinge of example embodiments may be installed relatively easily, and can be removed by the operator, if needed, without the use of tools to loosen or remove any nuts or bolts and without any pins, locking rings or other methods of retention. Instead, the hood can be installed by sequentially lining up offset pins that form the axis of rotation with corresponding receiving holes in a movable bracket. After initial alignment and installation, closing of the hood naturally locks the hinge, or otherwise moves it into an operating groove that is useful over the full range of motion of the hood. However, if desired, the hood can be placed in the fully open position and the cam surfaces that naturally locked the hinge upon closing may be disengaged to permit relatively easy removal of the hood by disengagement of the fixed and movable parts of the hinge assembly. Accordingly, the user experience may be enhanced.

In an example embodiment, an outdoor power equipment device is provided. The outdoor power equipment device includes a cutting deck mounted to a frame and housing at least one blade, an engine (e.g., gas, diesel or electric powered) and a hood hinge assembly. The engine may be supported by the frame and configured to selectively provide for rotation of the at least one blade responsive to coupling of rotary power of the engine to the at least one blade. The engine may be disposed in an engine compartment covered by a hood. The hood hinge assembly includes a fixed bracket mounted directly or indirectly to the frame and a movable bracket mounted to the hood to enable the hood to be moved between an open position and a closed position via rotation of the movable bracket relative to the fixed bracket. The hood hinge assembly defines an axis of rotation for the hood via a first offset pin and a second offset pin that have respective distal ends oriented in the same direction for sequential engagement with respective ones of a first receiving hole and a second receiving hole that are spaced apart from each other by a distance greater than a distance between the respective distal ends of the first and second offset pins The lawn care device of some embodiments may include additional features that may be optionally added. For example, in some embodiments, (1) the first and second offset pins may be disposed on the fixed bracket and the first and second receiving holes may be disposed on the movable bracket. Additionally or alternatively, (2) the first and second receiving holes may be disposed proximate to a distal end of respective ones of a first pivot arm and a second pivot arm of the movable bracket. In some cases, (3) the first and second pivot arms each include a cam edge disposed at distal ends thereof, and the cam edge is configured to engage a corresponding surface of a locking cam such that engagement of the locking cam and the cam edge during rotation of the hood to a closed position further seats the first and second receiving holes on the first and second offset pins, respectively. Additionally or alternatively, (4) the first and second pivot arms may singly or each include a detent disposed to form a rotational stop responsive to the rotational stop encountering a rotation limiter on the fixed bracket and the rotational stop may contact the rotation limiter when the hood is in a fully opened position. In some cases, (5) the rotational stop is configured to contact a surface of at least one of the first and second pivot arms over an entirety of a range of motion of the hood from the open position to the closed position and the surface may be disposed between a corresponding cam edge and the rotation limiter. Additionally or alternatively, (6) the first and second pivot arms each rotate within a hinge slot disposed in the fixed bracket responsive to further seating of the first and second receiving holes on the first and second offset pins, respectively. In some embodiments, (7) the first and second offset pins are disposed on the movable bracket and the first and second receiving holes are disposed on the fixed bracket.

In some embodiments, any or all of (1) to (7) may be employed, and the first and second receiving holes may be extruded holes. Additionally or alternatively, any or all of (1) to (7) may be employed, and the outdoor power equipment device may be a lawn tractor. Additionally or alternatively, any or all of (1) to (7) may be employed, and a portion of the hood may be held in the closed position via a hood retention feature including a male part that inserts into a female part to inhibit bouncing of the hood.

In an example embodiment, a method of installing a hood of an outdoor power equipment device is provided. The method may include providing assembly of a hood hinge assembly for rotation of the hood of an outdoor power equipment device between an open position and a closed position. The hood hinge assembly may include a fixed bracket mounted directly or indirectly to a frame of the outdoor power equipment device, and a movable bracket mounted to the hood to enable the hood to be moved between the open position and the closed position via rotation of the movable bracket relative to the fixed bracket.

Figure 7:
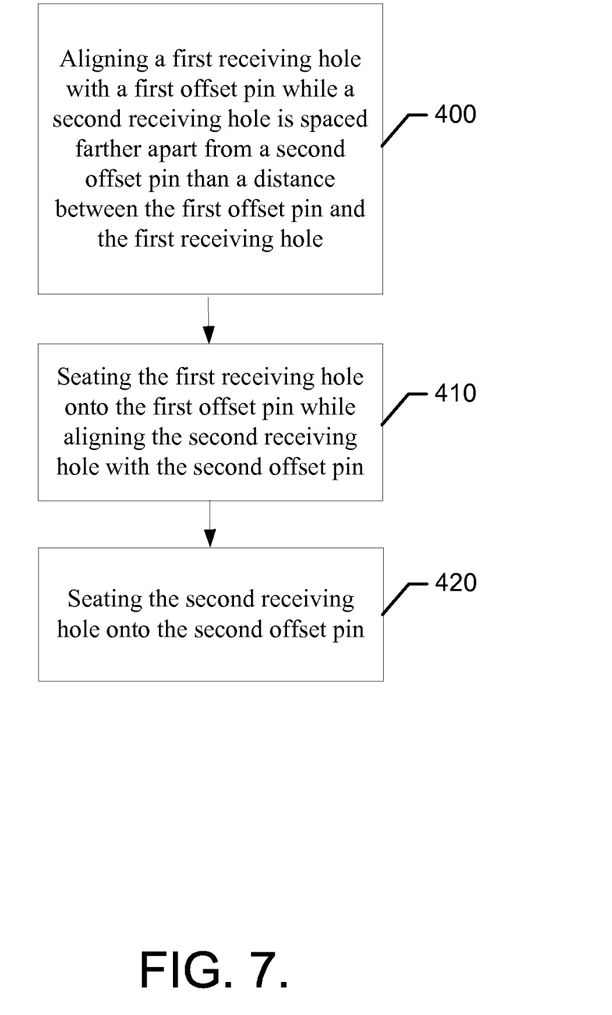
FIG. 7 illustrates a block diagram of a method of installing a hood of an outdoor power equipment device according to an example embodiment.

The hood hinge assembly may define an axis of rotation for the hood via a first offset pin and a second offset pin that have respective distal ends oriented in the same direction for sequential engagement with respective ones of a first receiving hole and a second receiving hole that are spaced apart from each other by a distance greater than a distance between the respective distal ends of the first and second offset pins. In the context of this method, providing assembly may include aligning the first receiving hole with the first offset pin while the second receiving hole is spaced farther apart from the second offset pin than a distance between the first offset pin and the first receiving hole at operation 400, seating the first receiving hole onto the first offset pin while aligning the second receiving hole with the second offset pin at operation 410, and seating the second receiving hole onto the second offset pin at operation 420.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An outdoor power equipment device comprising:
a cutting deck operably coupled to a frame and housing at least one blade;
an engine operably coupled to the frame and configured to selectively provide for rotation of the at least one blade responsive to operable coupling of rotary power of the engine to the at least one blade, the engine being disposed in an engine compartment covered by a hood; and
a hood hinge assembly comprising a fixed bracket operably coupled to the frame and a movable bracket operably coupled to the hood to enable the hood to be moved between an open position and a closed position via rotation of the movable bracket relative to the fixed bracket,
wherein the hood hinge assembly defines an axis of rotation for the hood via a first offset pin and a second offset pin that have respective distal ends oriented in the same direction for sequential engagement with respective ones of a first receiving hole and a second receiving hole that are spaced apart from each other by a distance greater than a distance between the respective distal ends of the first and second offset pins,
wherein the first and second offset pins are disposed on the fixed bracket,
wherein the first and second receiving holes are disposed proximate to a distal end of respective ones of a first pivot arm and a second pivot arm of the movable bracket, and
wherein the first and second pivot arms each comprise a cam edge disposed at distal ends thereof, and wherein the cam edge is configured to engage a corresponding surface of a locking cam such that engagement of the locking cam and the cam edge during rotation of the hood to a closed position further seats the first and second receiving holes on the first and second offset pins, respectively.

2. The outdoor power equipment device of claim 1, wherein the first and second pivot arms each comprise a detent disposed to form a rotational stop responsive to the rotational stop encountering a rotation limiter on the fixed bracket, the rotational stop contacting the rotation limiter when the hood is in a fully opened position.

3. The outdoor power equipment device of claim 2, wherein the rotational stop is configured to contact a surface of at least one of the first and second pivot arms over an entirety of a range of motion of the hood from the open position to the closed position, the surface being disposed between a corresponding cam edge and the rotation limiter.

4. The outdoor power equipment device of claim 1, wherein the first and second pivot arms each rotate within a hinge slot disposed in the fixed bracket responsive to further seating of the first and second receiving holes on the first and second offset pins, respectively.

5. The outdoor power equipment device of claim 4, wherein the distal ends of the first and second pivot arms fit within each respective hinge slot to retain the hood hinge assembly in a side-to-side direction.

6. The outdoor power equipment device of claim 1, wherein the first and second offset pins are disposed on the movable bracket and wherein the first and second receiving holes are disposed on the fixed bracket.

7. The outdoor power equipment device of claim 1, wherein the first and second receiving holes are extruded holes.

8. The outdoor power equipment device of claim 1, wherein the outdoor power equipment device is a lawn tractor.

9. The outdoor power equipment device of claim 1, wherein a portion of the hood is held in the closed position via a hood retention feature comprising a male part that inserts into a female part to inhibit bouncing of the hood.

10. A hood hinge assembly for rotation of a hood of an outdoor power equipment device between an open position and a closed position, the hood hinge assembly comprising:
a fixed bracket operably coupled to a frame of the outdoor power equipment device; and
a movable bracket operably coupled to the hood to enable the hood to be moved between the open position and the closed position via rotation of the movable bracket relative to the fixed bracket,
wherein the hood hinge assembly defines an axis of rotation for the hood via a first offset pin and a second offset pin that have respective distal ends oriented in the same direction for sequential engagement with respective ones of a first receiving hole and a second receiving hole that are spaced apart from each other by a distance greater than a distance between the respective distal ends of the first and second offset pins, wherein the first and second offset pins are disposed on the fixed bracket, wherein the first and second receiving holes are disposed proximate to a distal end of respective ones of a first pivot arm and a second pivot arm of the movable bracket, and wherein the first and second pivot arms each comprise a cam edge disposed at distal ends thereof, and wherein the cam edge is configured to engage a corresponding surface of a locking cam such that engagement of the locking cam and the cam edge during rotation of the hood to a closed position further seats the first and second receiving holes on the first and second offset pins, respectively.

11. The hood hinge assembly of claim 10, wherein the first and second pivot arms each comprise a detent disposed to form a rotational stop responsive to the rotational stop encountering a rotation limiter on the fixed bracket, the rotational stop contacting the rotation limiter when the hood is in a fully opened position.

12. The hood hinge assembly of claim 11, wherein the rotational stop is configured to contact a surface of at least one of the first and second pivot arms over an entirety of a range of motion of the hood from the open position to the closed position, the surface being disposed between a corresponding cam edge and the rotation limiter.

13. The hood hinge assembly of claim 10, wherein the first and second pivot arms each rotate within a hinge slot disposed in the fixed bracket responsive to further seating of the first and second receiving holes on the first and second offset pins, respectively.

14. The hood hinge assembly device of claim 13, wherein the distal ends of the first and second pivot arms fit within each respective hinge slot to retain the hood hinge assembly in a side-to-side direction.

15. The hood hinge assembly of claim 10, wherein the first and second offset pins are disposed on the movable bracket and wherein the first and second receiving holes are disposed on the fixed bracket.

16. The hood hinge assembly of claim 10, wherein the first and second receiving holes are extruded holes.

17. The hood hinge assembly of claim 10, wherein the outdoor power equipment device is a lawn tractor.

18. The hood hinge assembly of claim 10, wherein a portion of the hood is held in the closed position via a hood retention feature including a male part that inserts into a female part to inhibit bouncing of the hood.

19. A method of installing a hood of an outdoor power equipment device, the method comprising:

providing assembly of a hood hinge assembly for rotation of the hood of an outdoor power equipment device between an open position and a closed position, the hood hinge assembly comprising a fixed bracket operably coupled to a frame of the outdoor power equipment device, and a movable bracket operably coupled to the hood to enable the hood to be moved between the open position and the closed position via rotation of the movable bracket relative to the fixed bracket, the hood hinge assembly defining an axis of rotation for the hood via a first offset pin and a second offset pin that have respective distal ends oriented in the same direction for sequential engagement with respective ones of a first receiving hole and a second receiving hole that are spaced apart from each other by a distance greater than a distance between the respective distal ends of the first and second offset pins, wherein providing assembly comprises:

aligning the first receiving hole with the first offset pin while the second receiving hole is spaced farther apart from the second offset pin than a distance between the first offset pin and the first receiving hole;

seating the first receiving hole onto the first offset pin while aligning the second receiving hole with the second offset pin; and seating the second receiving hole onto the second offset pin, wherein seating the second receiving hole onto the second offset pin is accomplished via rotation the hood from the open position to the closed position such that a cam edge disposed at a distal end of at least one of the first or second pivot arms engages a corresponding surface of a locking cam such that engagement of the locking cam and the cam edge during rotation of the hood to the closed position further seats the second receiving hole on the second offset pin.

* * * * *

UNITED STATES PATENT AND TRADEMARK OFFICE
CERTIFICATE OF CORRECTION

PATENT NO. : 9,528,309 B2
APPLICATION NO. : 14/435550
DATED : December 27, 2016
INVENTOR(S) : Corey Fisher Page 1 of 1

It is certified that error appears in the above-identified patent and that said Letters Patent is hereby corrected as shown below:

In the Claims

In Column 16, Claim 19, Line 35, "offset pin is accomplished via rotation the hood from" should read --offset pin is accomplished via rotation of the hood from--.

Signed and Sealed this
Fourth Day of April, 2017

Michelle K. Lee
*Director of the United States Patent and Trademark Office*